United States Patent Office 2,794,800
Patented June 4, 1957

2,794,800

PREPARATION OF ANTITRYPTIC SUBSTANCE FROM SOYBEAN

Leo Rienks, Oak Park, and George B. Patterson, Park Forest, Ill., assignors to Armour and Company, Chicago, Ill., a corporation of Illinois No Drawing. Application January 6, 1954,
Serial No. 402,606

8 Claims. (Cl. 260—236.5)

This invention relates to the preparation of an antitryptic substance from soybean. In one of its aspects, this invention concerns a method of preparing trypsin inhibitor from soybean in greatly enhanced yields. In another aspect this invention concerns a novel composition from soybean containing an aggregate of factors which possesses a high degree of antitryptic activity.

Numerous substances have been previously described in the literature as antitryptic in function. This inhibiting or arresting effect on the activity of the proteolytic enzyme trypsin is manifested through various reaction mechanisms dependent on the substance used. In general, antitryptic substances may be classified on the basis of their origin as, for example, those obtained from biological sources as distinguished from substances derived essentially from non-biological sources.

Natural trypsin inhibitor designates the antitryptic substance which is found in extremely small amounts in pancreatic and other animal tissues. The reaction mechanism of the natural inhibitor with trypsin is described as being manifested through the formation of a dissociable molecular complex which is formed under favorable conditions of time, pH and temperature. On the other hand, the antitryptic substances from other biological sources including those of both plant and animal origin such as egg white, blood colostrum, lima bean, soybean, etc., apparently act as trypsin inhibitors through the formation of an irreversible stoichiometric complex with the proteolytic enzyme. A third type of enzymatic inhibition occurs through a denaturation or degradation mechanism which is comparable in effect to the inactivation of the enzyme caused by excessive heat. Many chemical substances of essentially non-biological origin are capable of inhibiting the action of trypsin by causing denaturation upon contact whereupon the activity of the enzyme is diminished or completely destroyed. These substances are generally quite toxic in and of themselves or result in the formation of toxic degradation products which necessarily limit their use as desirable antitryptic agents for most purposes.

Recently developed uses for trypsin in clinical therapy have created an extended need for a non-toxic trypsin inhibitor of high potency and quality. A crystalline form of trypsin inhibitor from soybean first reported by Kunitz in Science, volume 101, page 668 (1945), has been found to be satisfactory for such use. This crystalline product has been characterized in the literature as essentially a pure protein substance of the globulin type and has been also found to attain a maximum inhibiting activity after two crystallizations. In view of the extremely low yields of the substance from soybean, however, coupled with activity losses encountered in purification steps following known procedures, serious limitations exist relative to availability of this crystalline product for widespread usage. Accordingly, there is at the present time a definite need for improvement in the methods of production whereby larger quantities of trypsin inhibitor can be made available for general use.

We have discovered that greatly enhanced yields of trypsin inhibitor in the form of an amorphous substance can be isolated from an acidified aqueous extract of soybean. This amorphous substance is not only comparable in potency to the crystalline product previously mentioned but also possesses the other desirable attributes which are essential to its various uses including therapeutic applications. We have further found that soybean contains a plurality of active components which can be isolated as an amorphous composition by virtue of the process of this invention which is hereinafter described in detail. It will therefore be understood that our antitryptic substance is not a single component composition but is a mixture of active components which remain in association during the processing procedure to give the final preparation the characteristics and advantages hereinafter described.

Since the new and novel process of this invention is readily adaptable to commercial operation, it becomes obvious that the production of trypsin inhibitor from soybean can now be greatly extended to meet the growing demand.

It is accordingly an object of this invention to provide a practical method by which a high potency trypsin inhibitor can be recovered in an amorphous state from a crude aqueous extract. Another object of this invention is to provide a method for obtaining trypsin inhibitor from soybean in greatly enhanced yields. It is a further object of this invention to provide amorphous compositions from soybean which are highly effective antitryptic agents. It is yet another object of this invention to provide amorphous compositions from soybean which not only possess a high degree of antitryptic activity but which are also sufficiently non-toxic. Other objects and advantages of the invention will appear as the specification proceeds.

One phase of the present invention deals with a new trypsin inhibiting substance which is amorphous and contains a plurality of factors or components which possess marked antitryptic activity. Previously, workers in the art have concentrated their efforts toward the isolation of a single factor or component of soybean as represented by the crystalline product previously discussed. Bowman has reported in Proc. Soc. Exper. Biol. Med., 63, pp. 547–50 (1946), that soybean contains two active factors which are described as the alcohol-and-acetone-insoluble factors respectively. These products are both water soluble but differ significantly with respect to their activity and physicochemical properties.

Another phase of the present invention concerns the development of a process for directly recovering the aggregate of active factors from an acidified aqueous soybean extract. The crude extract which contains a high concentration of inert materials must be subjected to extensive purification before a useful antitryptic substance can be obtained. More specifically, it has been found that the crude extract can be essentially freed of inert materials directly by an inorganic salt precipitation of the entire activity spectrum followed by fractionation of the precipitate under controlled conditions of pH and salt concentration whereby the inerts are removed from the active principle. The purified substance can then be dried to yield an amorphous product containing the combined active principle. It thus becomes unnecessary to isolate the factors as separate products as previously done on the basis of their insolubility in various solvents such as acetone, alcohol, etc. In view of the fact that substantially all of the activity can now be recovered directly, it becomes apparent that the herein disclosed process circumvents considerable yield losses heitherto encountered in following the known procedures.

Broadly, any crude soybean extract can be used as a starting material in the present process. The preferred starting material is an acidified aqueous extract of soybean meal, the latter being commercially available under the trade name, Nutrisoy XXX. The soybean meal should preferably be either milled or flaked and non-heat dried since the desired activity principle is heat labile. Further, it is generally desirable to remove the lipoidal substance prior to the activity extraction step although the fat removal step can be readily incorporated in the process of this invention if desired.

In an embodiment of our process, an aqueous soybean extract having a pH ranging from 1.0 to 3.5 can be used. Preferred pH values are 1.5 to 2.5 and best results are achieved when the extract is adjusted to about 2.0. We have found that any acid which will not denature protein can be used in the extraction for adjusting the pH although it is preferred to employ sulfuric acid. The extraction can be carried out using any of the well-known extraction procedures and the spent meal is thereafter separated from the liquid phase by centrifugation or filtration. Frequently, a colloidal mixture is obtained during the course of the extraction which greatly complicates the mechanical procedures involved in the separation of the spent meal from the extract. This can be overcome by adding a small amount (about .05 saturation) of an inorganic salt such as ammonium sulfate which coagulates the meal residue thereby improving its filtration or centrifugation characteristics.

The extract containing the active principle together with a substantial bulk of inert contaminants is precipitated with an inorganic salt or neutral salt to form a solid phase which contains essentially all of the activity initially present in the extract together with a reduced amount of inert contaminants. Although various inorganic salts can be used in the precipitation step including ammonium and sodium chlorides, ammonium, sodium, magnesium sulfates etc., we have found that it is preferable to use ammonium sulfate because of its desirable solubility and endothermic characteristics in aqueous solutions. The amount of inorganic salt which is used for the initial precipitation can be varied broadly as between .3 saturation to more than the amount required for complete saturation. Within the designated pH range for the extract, however, amounts ranging from .4 to .7 saturation are preferred and best results are achieved at about .5 to .6 saturation. The precipitate is then separated from the liquid phase by centrifugation or filtration and the liquid phase which contains little or no activity is discarded.

By "saturation values" in this specification and claims, we mean the overall concentration of the inorganic salt in the aqueous phase relative to the solubility of the salt in water at 20° C.

If the lipoidal content of the starting material has not been removed by prior treatment, or, in the event its removal has not been complete, the precipitate can be conveniently treated for the purpose at this point. This can be achieved by freezing and grinding the precipitate and then dispersing the solid material in a suitable fat solvent. Of the various fat solvents which can be satisfactorily used including skellysolve, petroleum ether, ethyl alcohol, acetone, etc., we have found that the use of acetone is preferable in that the suspension readily separates on standing and the solvent containing the dissolved fat can be readily removed by siphoning or decanting. Such a clear separation is generally not achieved with the use of the other solvents thereby necessitating an added separation step as centrifugation or the like in order to remove the lipoid-containing liquid phase.

The defatted precipitate contains in addition to the antitryptic activity, a considerable bulk of inert material and residual solvent impurities. A substantial portion of the impurities are removed by suspending the precipitate in an amount of water sufficient to form a free-flowing slurry and then selectively solubilizing the activity. To do this, it is necessary to adjust the pH of the system at this point with a base to between 5.8 and 6.6.

The pH adjustment is critical over the indicated range in order to effect the desired purification without extensive denaturation of the antitryptic activity. For example, pH values below 5.8 cause the solubilization of excessive amounts of the inert substance together with the active components. On the other hand, pH values exceeding 6.6 cause substantial denaturation of the active components. These pH values may be extended somewhat if it is desired to use other than room temperature conditions. For example, a neutral or slightly alkaline pH can be used if the suspension is maintained at about 5° C.

The inorganic salt concentration in the mixture is then lowered in order to achieve a selective solubilization of the activity. This can be accomplished in various ways, as, for example, dialysis, dilution, ion exchange, etc. Either method can be used provided that the necessary precautions are taken to avoid excessive pH changes beyond the indicated limits. The inorganic salt concentration should preferably be reduced to a minimum for best results. However, reasonably good separations can be achieved with salt concentrations reduced to about .1 saturation or lower. Any necessary adjustments during or after the salt concentration lowering step should be made to maintain the pH of the mixture to within the previously designated limits. The insolubles remaining at the reduced salt concentration stage at pH 5.8–6.6 are then separated by centrifugation or filtration from the liquid phase which contains substantially all of the soybean antitryptic activity.

The amorphous product can be recovered for use from the liquid at this stage of the processing as a crude preparation. It is generally feasible, however, to subject the material to further purification to remove remaining inert materials in order to obtain a high potency product on a unit weight basis comparable to the crystalline product previously mentioned. The further purification can be achieved by subjecting the immediately preceding centrifugate or filtrate to a second precipitation with inorganic salt, suspending the precipitate in a minimal amount of water and lowering the salt concentration at the same controlled pH range to selectively solubilize the activity-containing components.

In this latter purification procedure, it is desirable to again use ammonium sulfate as the inorganic salt for the same reasons previously stated in connection with the initial precipitation. Although a wide concentration range may again be employed, it is preferred to add amounts of inorganic salt sufficient to establish saturation values ranging between .3 and .4 for best results. The precipitate which again contains essentially all of the desired activity is removed from the liquid phase by centrifugation, etc. The slight amount of activity contained in the liquid phase may be recovered, if desired, but the amount which is present generally does not warrant the required added effort and expense.

The precipitate is suspended in a minimal amount of water required to form a free-flowing slurry and the pH is adjusted as before to a value between 5.8 and 6.6. The salt concentration is then lowered to selectively solubilize the activity-containing components while retaining most of the inactive material in an insoluble state.

At this stage of the process, it is desirable to reduce the inorganic salt concentration to a minimum level while maintaining the liquid phase at a pH from about 5.8 to 6.6. At this pH range, the soybean trypsin inhibitor is soluble and stable in the liquid state whereas inert substances are essentially insoluble at the reduced salt concentration. Since soybean trypsin inhibitor is non-diffusable through cellophane membranes, the inorganic salt can be selectively eliminated by dialysis against running tap water. The dialyzed solution is clarified by filtration to remove the insoluble matter after making whatever pH adjustment which may be necessary to maintain the designated limits.

Alternatively, the inorganic salts can be removed by treating the mixture with ion-exchange resins of the cationic-anionic type as previously mentioned, care being exercised to avoid drastic changes in pH beyond the stated values.

In the terminal step following salt removal and clarification of the liquid phase containing the active principle, the solution is subjected to a drying procedure whereby the product is converted to its amorphous state. This can be achieved by utilizing well known freeze-drying techniques whereby activity loss due to deterioration and denaturation is kept to a minimum. Although the anti-tryptic substance is soluble at higher pH values, we have achieved best results by adjusting the pH of the solution with acid to from about 2.0 to 4.0 prior to freezing. The amorphous product obtained thereby possesses excellent solubility properties and can be completely reconstituted with water prior to its use.

On a quantitative basis, the yields obtained using the process of this invention based on overall recovery of the activity principle in solid form from soybean exceed prior art methods of production nearly ten-fold.

Electrophoretic analyses show the presence of at least five distinct protein fractions, having average mobilities ranging from 1.01 to 6.35. Further, the amorphous preparation in solution has been subjected to isoelectric precipitation wherein several of the specific component fractions have been isolated and crystallized to yield the separate components in highly purified form.

The activity of our preparation was evaluated using a modified Anson-Mirsky hemoglobin assay method wherein a trypsin preparation of known proteolytic activity is combined in a 1:1 weight ratio with the inhibitor using well-known procedures. The resulting compound was removed from the supernatant, the latter then being assayed for proteolytic activity against hemoglobin. The reduction of proteolytic activity as against the known initial value is due to the combination of the inhibitor with the enzyme and is expressed as percent inhibition. The percent inhibition is accordingly taken as the quantitative measure of anti-tryptic activity.

In order to exclude the possibility of proteolytic activity being present in the preparation, suitable blanks are run simultaneously. In addition, assay results are corrected for residual ash and moisture whereby experimental error is reduced to about a 5% maximum.

The toxicity of the amorphous preparation was evaluated along with crystalline trypsin inhibitor and doses of each preparation up to 1000 mg. per kilogram of body weight in rats were found to be inocuous on intravenous administration.

Specific examples of the process and analytical data are set out as follows:

*Example I*

160 pounds of commercially defatted, non-heat dried soybean flakes were suspended in 500 liters of 0.25 N sulfuric acid. 4 kilograms of ammonium sulfate were added and the mixture was agitated slightly for 30 minutes. The extracted meal was separated by means of centrifugation and discarded. 280 liters of the acid extract were brought to a concentration of 0.5 ammonium sulfate saturation by the addition of 188 pounds of the solid salt. The precipitate was removed by centrifugation and the supernatant discarded. The crude precipitate (39.1 kilograms) was frozen in trays at −80° C. and comminuted. The frozen and milled precipitate was washed twice with 40 liters of acetone. The defatted precipitate was separated from the acetone by filtration. The precipitate was suspended in about 22 liters of distilled water and the pH adjusted to 6.6 with 1 N sodium hydroxide. This solution was dialyzed against tap water until all excess acetone and salt were removed. The dialyzed solution, which was then at pH 5.3 was adjusted to pH 5.8 by the addition of sodium hydroxide, and clarified by centrifugation. The clarified solution (65 liters) was brought to an ammonium sulfate concentration of 0.8 saturation by the addition of 80 pounds of the solid salt. The resulting precipitate was removed by centrifugation and the supernatant discarded. The precipitate (1605 grams) was suspended in 5 liters of distilled water and the pH adjusted to 6.5 with sodium hydroxide. This solution was dialyzed against tap water until salt-free. The dialyzed solution was filtered to remove any insoluble material present. The clarified solution was then adjusted to pH 3.0 with hydrochloric acid and lyophilized. A total of 366 grams of dried amorphous product were obtained from the 280 liter batch of the acid extract. This dried material displayed 91% inhibition when tested against crystalline trypsin at a 1:1 weight ratio.

*Example II*

4 kilograms of commercially defatted, non-heat dried soybean flakes were suspended in 20 liters of 0.25 N sulfuric acid and the mixture agitated slightly for 2½ hours. The extracted meal was removed by means of a wine press and discarded. The acid extract (16 liters) was brought to a concentration of 0.3 ammonium sulfate saturation by the addition of 2.8 kilograms of the solid salt. 100 grams of the resulting, crude amorphous precipitate were dialyzed salt-free and lyophilized. This crude precipitate obtained at 0.3 ammonium sulfate saturation was assayed against crystalline trypsin at a 1:1 weight ratio. This crude product showed 26.5% inhibition of the enzyme. Thus, it can be seen that even crude precipitates of soybean trypsin inhibitor obtained at ammonium sulfate concentrations as low as 0.3 saturation exhibit inhibiting effects on trypsin.

*Example III*

4 kilograms of commercial defatted, non-heat dried soybean flakes were suspended in 20 liters of 0.25 N sulfuric acid and the mixture was slowly agitated for 1 hour. The extracted meal was removed by means of a wine press and discarded. The acid extract (16 liters) was brought to a concentration of 0.6 ammonium sulfate saturation by the addition of 6.2 kilograms of the solid salt. The crude precipitate was removed by centrifugation and saved. The supernatant was brought to a concentration of 0.8 ammonium sulfate saturation by the addition of 2.2 kilograms of the solid salt. The resulting small quantity of precipitate was removed, dialyzed and lyophilized. Its assay indicated only about 9% inhibition. It can be seen that the quality and quantity of product which is precipitated from a solution at 0.8 ammonium sulfate saturation subsequent to precipitation of active ingredients at 0.6 saturation is relatively insignificant.

*Example IV*

A portion of the salt-free solution prepared as described in Example I was analyzed electrophoretically. The pattern revealed six components ranging in average mobility and percent available as follows:

| Component | Mobility (Average) | Percent Available |
|---|---|---|
| 1 | 1.01 | 16 |
| 2 | 1.78 | 12 |
| 3 | 2.56 | 8 |
| 4 | 3.44 | 15 |
| 5 | 4.85 | 48 |
| 6 | 6.35 | 1 |

*Example V*

The yield of crystalline trypsin inhibitor using a conventional method of preparation was 0.575 gram per kilogram of soybean meal, the activity of the product being 86%. Using the process of this invention, the yield of amorphous product was found to be 4.8 grams per kilogram of soybean meal and the activity was 91%. A 53.5 gram portion of the amorphous preparation was crystallized using conventional procedures to give 27 grams of crystalline material which exhibited 86% activity. The mother liquors were combined and dried to yield 19.5 grams of amorphous product which upon assay showed 90% activity.

While in the foregoing specification we have set forth certain details and specific steps, it will be understood that variations therein may be made by those skilled in the art without departing from the spirit of our invention.

We claim:

1. In a process for preparing an antitryptic substance, the steps of extracting soybeans with an aqueous solution at a pH of from 1.0 to 3.5 to obtain an aqueous extract of said antitryptic substance, separating said aqueous extract from the soybean residue, mixing with the separated aqueous extract at a pH of from 1.0 to 3.5 a neutral salt to precipitate said antitryptic substance, and to selectively solubilize contaminants thereof, separating said precipitate from residual liquid.

2. In a process for preparing an antitryptic substance, the steps of extracting soybeans with an aqueous solution at a pH of from 1.0 to 3.5 to obtain an aqueous extract of said antitryptic substance, separating said aqueous extract from the soybean residue, mixing with the separated aqueous extract at a pH of from 1.0 to 3.5 a neutral salt to precipitate said antitryptic substance, and to selectively solubilize contaminants thereof, separating said precipitate from residual liquid, suspending the separated precipitate in water at a pH of from 5.8 to 6.8, reducing the neutral salt concentration of the resulting suspension while maintaining the pH thereof within the range of from 5.8 to 6.6 to selectively solubilize the antitryptic substance, and separating the resulting aqueous solution of the antitryptic substance from insoluble matter.

3. The process of claim 2 in which said neutral salt is ammonium sulfate.

4. The process of claim 2 in which the salt concentration of said suspension is reduced by dialysis.

5. The process of claim 2 in which the salt concentration of said suspension is reduced by adsorbing the neutral salt on cationic-anionic type ion exchangers.

6. In a process for preparing an antitryptic substance, the steps of extracting soybean meal with an aqueous solution at a pH of from 1.0 to 3.5 to obtain an aqueous extract of said antitryptic substance, separating said aqueous extract from the soybean residue, mixing with the separated aqueous extract at a pH of from 1.0 to 3.5 a neutral salt in such amount as to obtain in the resulting mixture a neutral salt concentration of from 0.3 to 0.7 saturation to precipitate said antitryptic substance and to selectively solubilize contaminants thereof, separating said precipitate from residual liquid, suspending the separated precipitate in water at a pH of from 5.8 to 6.6, reducing the neutral salt concentration of the resulting suspension to below 0.1 saturation to selectively solubilize the antitryptic substance, separating the resulting aqueous solution of the antitryptic substance from insoluble matter, mixing with the separated aqueous solution of the antitryptic substance a neutral salt in such amount as to obtain in the resulting mixture a neutral salt concentration of from 0.3 to 0.7 saturation to precipitate said antitryptic substance and to selectively solubilize contaminants thereof, separating said precipitate from residual liquid, suspending the separated precipitate in water at a pH of from 5.8 to 6.6, dialyzing the resulting suspension to reduce the neutral salt concentration thereof to selectively solubilize the antitryptic substance, separating the resulting aqueous solution of the antitryptic substance from insoluble matter, adjusting the separated aqueous solution of the antitryptic substance to a pH of from 2.0 to 4.0, and freeze-drying the adjusted aqueous solution to obtain the antitryptic substance in dry form.

7. In a process for preparing an antitryptic substance, the steps of extracting non-heat-dried soybean meal with an aqueous solution at a pH of from 1.0 to 3.5 to obtain an aqueous extract of the antitryptic substance while having present in the extraction mixture a neutral salt in such amount as to obtain therein a neutral salt concentration of not more than 0.05 saturation to coagulate the soybean residue, and separating said aqueous extract from the soybean residue.

8. In a process for preparing an antitryptic substance, the steps of extracting non-heat-dried soybean meal with an aqueous solution at a pH of about 2.0 to obtain an aqueous extract of the antitryptic substance while having present in the extraction mixture ammonium sulfate in such amount as to obtain therein an ammonium sulfate concentration of not more than 0.05 saturation to coagulate the soybean residue, and separating said aqueous extract from the soybean residue, mixing with the separated aqueous extract ammonium sulfate in such amount as to obtain in the resulting mixture an ammonium sulfate concentration of about 0.5 saturation to precipitate the antitryptic substance and to selectively solubilize contaminants thereof, separating said precipitate from residual liquid, freezing the separated precipitate, comminuting the frozen precipitate, mixing with said frozen precipitate acetone in such amount as to solubilize lipoidal substances contained therein, separating the defatted precipitate from the solvent solution, suspending the defatted precipitate in water in such amount as to form a free-flowing slurry adjusting said free-flowing slurry to a pH of from 5.8 to 6.6, reducing the ammonium sulfate concentration of the adjusted free-flowing slurry to not more than 0.1 saturation to selectively solubilize the antitryptic substance, separating the resulting aqueous solution of the antitryptic substance from insoluble matter, mixing the separated aqueous solution of the antitryptic substance with ammonium sulfate in such amount as to obtain in the resulting mixture an ammonium sulfate concentration of about 0.3 saturation to precipitate the antitryptic substance and to selectively solubilize contaminants thereof, separating said precipitate from residual liquid, suspending the separated precipitate in water in such amount as to obtain a free-flowing slurry, dialyzing said free-flowing slurry to reduce the ammonium sulfate concentration thereof to selectively solubilize the antitryptic substance, separating the resulting aqueous solution of the antitryptic substance from insoluble matter, adjusting the said aqueous solution of the antitryptic substance to a pH of from 2.0 to 4.0, and freeze-drying the adjusted aqueous solution to obtain the antitryptic substance in dry form.

References Cited in the file of this patent

UNITED STATES PATENTS 2,670,291    Melnick _____ Feb. 23, 1954

OTHER REFERENCES

Kunitz: Jour. Gen. Physiology 29, 1946, pages 149–154.

Markley: Soybeans and Soybean Products, Interscience Pub., Inc., N. Y., 1950, pages 356–357, 906.

Green et al.: Biochem. Jour. (London), 54 (1953), pages 257–264.